US008488834B2

(12) United States Patent
Honsinger et al.

(10) Patent No.: US 8,488,834 B2
(45) Date of Patent: Jul. 16, 2013

(54) METHOD FOR MAKING AN ASSURED IMAGE

(75) Inventors: Chris W. Honsinger, Ontario, NY (US); Paul W. Jones, Churchville, NY (US); Robert J. McComb, Mississauga (CA)

(73) Assignee: Certifi-Media Inc., Union Hill, NY (US)

( * ) Notice: Subject to any disclaimer, the term of this patent is extended or adjusted under 35 U.S.C. 154(b) by 1428 days.

(21) Appl. No.: 11/940,347

(22) Filed: Nov. 15, 2007

(65) Prior Publication Data

US 2010/0021001 A1  Jan. 28, 2010

(51) Int. Cl.
*G06K 9/00* (2006.01)
*G06K 9/34* (2006.01)

(52) U.S. Cl.
USPC .......................... 382/100; 382/173

(58) Field of Classification Search
None
See application file for complete search history.

(56) References Cited

U.S. PATENT DOCUMENTS

| | | | | |
|---|---|---|---|---|
| 6,005,936 A * | 12/1999 | Shimizu et al. | ............... | 713/176 |
| 6,278,791 B1 * | 8/2001 | Honsinger et al. | ............ | 382/100 |
| 6,553,494 B1 * | 4/2003 | Glass | ............. | 713/186 |
| 7,394,573 B1 * | 7/2008 | Goldberg et al. | ............. | 358/3.28 |
| 7,706,567 B2 * | 4/2010 | McComb | ....................... | 382/100 |
| 2001/0046307 A1 | 11/2001 | Wong | | |
| 2003/0048921 A1 * | 3/2003 | Cahill et al. | .................. | 382/100 |
| 2005/0036651 A1 * | 2/2005 | Wen | ............................. | 382/100 |
| 2005/0071283 A1 | 3/2005 | Randle et al. | | |
| 2005/0089246 A1 * | 4/2005 | Luo | ............................. | 382/286 |
| 2006/0106717 A1 | 5/2006 | Randle et al. | | |
| 2006/0188170 A1 * | 8/2006 | Kanda et al. | .................. | 382/255 |
| 2007/0047814 A1 | 3/2007 | Yamazaki | | |
| 2007/0253592 A1 * | 11/2007 | Sun et al. | ....................... | 382/100 |
| 2007/0291977 A1 * | 12/2007 | McComb | ....................... | 382/100 |

OTHER PUBLICATIONS

FSTC Image quality and usability report, 2004.*
P. Marzilario, F. Dufaux, S. Winkler, T. Ebrahimi, "A no-reference perceptual blur metric" Proceedings of the IEEE International Conference on Image Processing, vol. III, pp. 57-60, Sep. 2002.

* cited by examiner

*Primary Examiner* — Li Liu
(74) *Attorney, Agent, or Firm* — Louis S. Horvath

(57) ABSTRACT

A method for producing an assured image acquires image data and segments the image data into one or more spatial regions. One or more quality measures is calculated from the image data that is within the one or more spatial regions. Secure assurance data is produced that is representative of the one or more quality measures and the image data. The secure assurance data is associated with the image data to produce the assured image.

24 Claims, 17 Drawing Sheets

METHOD FOR MAKING AN ASSURED IMAGE

RELATED APPLICATIONS

Reference is made to commonly assigned U.S. Pat. No. 7,706,567, filed May 16, 2006 and entitled "Assured Document and Method of Making" by Robert J. McComb.

FIELD OF THE INVENTION

The invention relates generally to data integrity in digital image processing, and in particular to a method for assessing and certifying the quality of a digital image representation of a physical medium or scene and securing the integrity of the quality certification and the digital image representation.

BACKGROUND OF THE INVENTION

Corporations, institutions, and governments spend hundreds of millions of dollars each year to digitize documents, films, maps, books, and other physical media. Included in this mix are billions of pages of medical records, legal evidence, corporate documents, material from national and regional archives, and banking checks. The resulting digital image files represent valuable information whose accuracy and security have significance in current working operations and for long-term archiving. The digitization process is the gateway for this information onto networked systems, which allows for convenient, cost effective, and efficient transmission, storage, searching, and retrieval of the image information. The demand for digital scanning of physical media has increased dramatically in the last few years because of large improvements in communication bandwidth and digital storage capabilities of such systems.

This surge in the digitization of physical media is exemplified by the announcement by Google Inc. on 14 Dec. 2005 that it is working with the libraries of Harvard, Stanford, University of Michigan, and University of Oxford, as well as The New York Public Library, to digitally scan books from their collections so that users around the world can access them using the Google search engine. As another example, the Check Clearing for the 21st Century Act ("Check 21"), which was signed into law and became effective on Oct. 28, 2004, allows banks to move checks electronically, rather than as physical documents, in order to make the check clearance process faster and more efficient. Banks can scan the front and back of a check and then transmit this image data and payment information in lieu of shipping the original check. If a paper check is required, the bank can use the image data and payment information to create a paper "substitute check." Banks are not required to keep the original check, and it is typically destroyed or "truncated" to reduce maintenance costs.

Organizations also spend vast amounts of money on capturing day-to-day activities with digital image capture devices, such as inspection cameras for manufacturing processes, forensic crime scene cameras, in-car police cameras, automated teller machine (ATM) cameras, and surveillance cameras for monitoring facilities, equipment, and personnel. Some of these applications use computer vision techniques to automatically analyze the images for certain features or events. In many cases, the images that are produced by these devices are never viewed by a human being unless a specific event triggers a review. Regardless of whether the images are analyzed by computers or viewed by humans, it is essential that the image data represent the physical scene with sufficient fidelity for the intended application.

Because of the sensitive nature of the information in many applications, it is important to ensure that the image data is not tampered with after it is generated. It is a simple matter to change the contents of a digital image by using an image editor or other readily available computer technology. Increased awareness of security and privacy issues is resulting in national and international legislation that addresses such concerns about tampering. For example, the Canadian government recently began a program to provide public Internet access to its heritage or historical repositories. Fears about the possible tampering of the government data compelled the Canadian Parliament to require that the controlling organizations make "reasonable" attempts to ensure the integrity of their scanned images.

One approach to ensuring data integrity is to use encryption. However, encryption can be computationally expensive for large amounts of data, such as is the case for high resolution images and video sequences. As a result, a more practical approach to ensuring the integrity of a digital data file is to use a digital signature. Digital signatures are based on the concept of a hash. A hash is a relatively short numerical value that represents a distilled version of the larger digital data file. Methods that perform this distillation are referred to as hash functions or hash algorithms, and they are used widely in computer systems. Hash functions are designed so that a small change in the digital data file will produce a significant change in the calculated hash value. A digital signature is an encrypted version of the hash, typically using a public-key infrastructure (PKI) algorithm, and the digital signature is associated with the digital file in some way, such as attaching it to the file header or storing in a database that is indexed by the filename or other unique identifier. In this way, any tampering with the digital data can be detected by recalculating the hash and comparing it to the original hash in the secure digital signature. Any discrepancy between the two hash values indicates tampering with the digital data in the file. An image that has been associated with a digital signature in the manner just described is often called a "secure" image. A benefit of securing images with digital signatures is that the image data itself is in the "clear", that is, unencrypted, which means it can be used like any other image, yet its integrity can be verified at any time.

While these approaches allow the integrity of image data to be verified, they do not address the issue of the quality of the image data. Image quality is determined by many factors, including such attributes as resolution, sharpness, dynamic range, noise, and color reproduction. The digital image data that represents a physical medium or scene could be meaningless, erroneous, or artifact-laden for a variety of reasons, such as a defective scanner or a camera that is out of focus, for example. In such cases, the techniques for authenticating data as described previously may be of limited value because they can be protecting data that is worthless.

The knowledge that image data is a satisfactory replica of an original physical medium or scene is clearly important. Companies that are responsible for the scanning of important documents for governments, financial institutions, and other concerns may become liable for loss of valuable information if the scanned image quality is insufficient and the original physical documents have been destroyed. For example, banks that scan checks to produce electronic records under Check 21 are liable for any financial losses associated with poor quality images. Even if the original documents are still available, significant costs may incurred in rescanning. End users of the scanned documents may also be affected by poor scan quality because of a diminished ability to extract or interpret the information that was contained in the original document. Likewise, law enforcement agencies may be hampered in their identification and prosecution of criminals if surveillance video images or forensic still images have insufficient quality.

In a Check 21 environment, image quality is typically assessed at the point of image capture, and the image quality affects the workflow of the electronic check data. For example, a poor quality image may require special handling, which incurs extra costs. A bank that receives a poor quality check image might require the originating bank to rescan the check, or the receiving bank might simply assume liability for the cost of the check if it is a small dollar amount. The result is an increase in service costs and delays in completing the clearance of checks, as well as the potential loss of good will with customers. Thus, there is a significant value associated with the ability to properly assess image quality.

There are various ways to assess image quality. One approach is to have a trusted human being review an image for image quality before submitting the image data to a secure hash algorithm to establish data integrity. However, given the tremendous number of images that are produced daily, a human-based quality control solution is not economically viable in many applications. In addition, human error rates may be significant and may exceed the threshold of customer tolerance.

Another approach to assessing image quality is to use test targets. A test target acts as a reference image, and the quality metrics calculated from that reference can provide measures of actual versus ideal performance for a capture device. Quality measurements using known test targets are termed "full reference" measurements. Test targets are often used on an intermittent basis during the operation of an image capture device to determine if the device is performing as expected. However, the intermittent use of test targets doesn't necessarily provide information about the image quality that is achieved for the capture of a particular physical medium or scene. One reason for this is the actual physical medium or scene may have unique imaging properties as compared to the test target, potentially leading to reduced quality even if the test target image quality is acceptable. For example, an adaptive image processing algorithm that automatically controls image brightness and contrast might not produce the optimal code values for the image data because of the background color in the image. Another reason could be mechanical malfunction, such as when a document feed mechanism fails to place a document properly on the scanning platen or when two documents are inadvertently piggybacked together. It is possible for these failures to occur only sporadically, and the test target images may not suffer from such failures. In some applications, it may be possible to include a test target in every image that is captured by a device, but this can be costly and is often impractical. Moreover, it still may be the case that quality of the captured medium or scene is not fully reflected in the quality that is determined from the included test target data, for reasons such as those described previously.

A third approach is to assess image quality directly from the captured image data itself. When the only information that is available to assess quality is the image data, which generally has unknown characteristics, the quality measurement techniques are referred to as "no-reference" methods. An example of a no-reference image quality metric is described in a technical paper entitled "A no-reference perceptual blur metric" by P. Marziliano, F. Dufaux, S. Winkler, and T. Ebrahimi, *Proceedings of the IEEE International Conference on Image Processing*, Vol. III, pp. 57-60, September 2002. The method in this paper computes a blur metric (that is, a loss in sharpness) by identifying vertical edges in an image and then determining the average spatial extent of the edges. The Financial Services Technology Consortium (FSTC), which is a consortium of banks, financial services providers, academic institutions, and government agencies, has investigated a similar no-reference blur metric for Check 21 applications. The FSTC has also investigated a number of other no-reference quality metrics for Check 21 applications, including compressed image file size, document skew angle, and number of black pixels (for a bi-tonal image). A full description of the FSTC quality metrics can be found at the FSTC web site.

Regardless of the method that is used to assess image quality, it is also necessary to have the image quality measures secured against possible tampering because of the previously discussed economic, liability, and legal issues that are associated with image quality. Moreover, at various points in the lifecycle of a digital image, it may be desirable to check quickly on the image quality without having to perform another visual inspection or computer analysis of the image data. This capability can be achieved by assessing image quality once, typically at the point of capture, and then securing the quality metrics against tampering. Furthermore, it is desirable to have the secure image quality measures and the secure image data inseparably linked, so that any change in the image data renders the associated quality metrics as invalid. Current applications that assess image quality, such as Check 21 processing systems, do not secure the image quality metrics and hence are susceptible to tampering of the quality data, which may result in an inefficient workflow and financial losses. It is easy to imagine that a digital scan of a check may be vulnerable to courtroom challenge on the basis of poor image quality, despite the use of digital signatures for the image data itself by the bank. With secure image quality measures, the liabilities of those parties who are responsible for the scanned data can be minimized.

In a commonly assigned U.S. Pat. No. 7,706,567 entitled "Assured document and method of making" by Robert J. McComb, filed 16 May 2006, a method is taught for assessing the scanned image quality of documents using test targets and for securing the image quality assessment in combination with secure image data. The document images that are produced by this method are termed "assured documents". Image quality metrics are calculated from test targets that are periodically inserted into a document queue, and these metrics are associated with the scanned image data for user documents that were in the same document queue. The quality metrics are associated with the image data of an individual user document by combining the quality metrics with a secure hash value that represents a distillation of the image data, followed by encryption of the combined quality metrics and hash value. The encrypted quality metrics and hash value are stored in the file header or filename of the digital document, or by other means, as disclosed in the McComb patent.

While the method of McComb is aimed primarily at document scanning applications, it is clear that the method of securing image quality metrics and associating the secure quality metrics with the image data has broader applicability to other imaging applications. However, relying on test targets for assessing image quality can be constraining, particularly where test targets may not be readily available or usable. For example, placing a test target into every scene that is captured with a rotating surveillance camera is obviously impractical. Moreover, even if test targets were practical in an application, the production of the test targets and the need for a mechanism (either automated or manual) for inserting the test targets into an image capture workflow can add considerable complication and expense.

Thus, there is the need for a method to efficiently assess the image quality of image data on an individual image basis, without relying strictly on the use of test targets, and to securely associate the image quality with the image data, while also ensuring the integrity of the image data.

SUMMARY OF THE INVENTION

The present invention is directed to overcoming one or more of the problems set forth above. Briefly summarized, according to one embodiment of the present invention, a method is disclosed for producing an assured image comprising:

a) acquiring image data;

b) segmenting the image data into one or more spatial regions;

c) calculating one or more quality measures from the image data that is within the one or more spatial regions;

d) producing secure assurance data that is representative of the one or more quality measures and the image data; and e) associating the secure assurance data with the image data to produce the assured image.

ADVANTAGEOUS EFFECT OF THE INVENTION

It is an advantage of the method of the present invention that it computes image quality measures from a digital image, wherein the quality measures are uniquely representative of the quality of the digital image, and the quality measures are secured so that they can be easily and quickly verified at any time.

It is another advantage of the method of the present invention that the image data is secured so that the integrity of the digital image can be verified to detect tampering.

It is a further advantage of the present invention that the secure quality metrics are inseparably linked to the secure image data so that any changes to the image data render the quality metrics as invalid.

It is yet another advantage of the method of the present invention that image quality measures are computed from one or more spatial regions of a digital image to provide quality measures that are uniquely representative of the quality of the digital image.

These and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
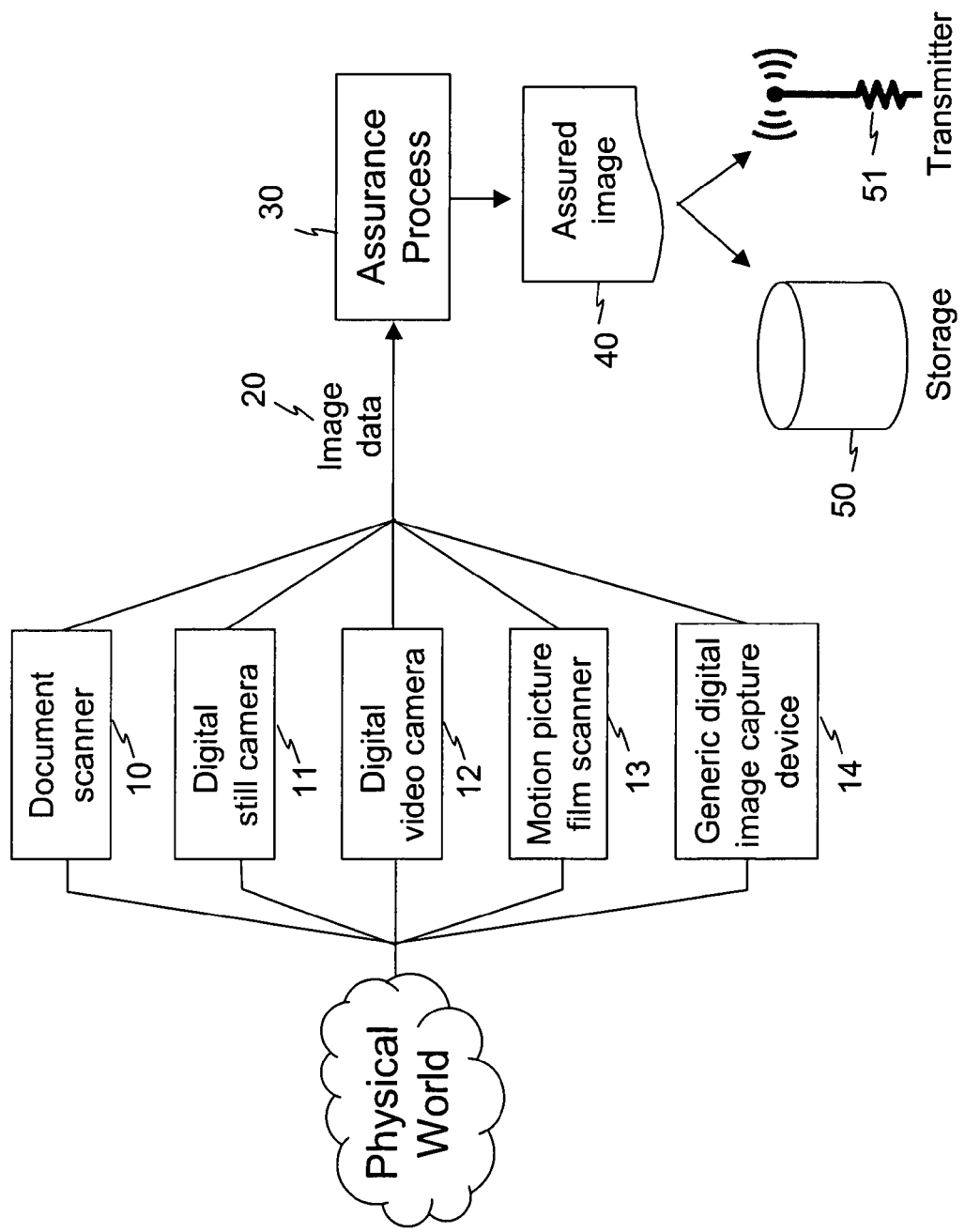
FIG. 1 is a block diagram overview of the image processing workflow for producing assured images with embodiments of the present invention.

In the disclosure that follows, elements not specifically shown or described may take various forms well known to those skilled in the art.

The invention is directed to forming a digital file from image data generated by digitization of a physical medium or a physical scene. The physical media may, for example, include any of various types of written, printed, or imaged records such as bank checks, X-ray film, photographic film, historical letters, scholarly papers, photographs, income tax forms, and book or periodical pages, for example. Physical scenes include any physical entity or entities, such as people, places, and objects, for example, that have been imaged by an image capture device. Embodiments of the present invention encompass image data from any type of digital image capture device. Some types of image capture devices, such as scanners, pass physical media over one-dimensional (1-D) line sensors to construct a two-dimensional (2-D) image data representation. Other imaging devices, such as digital cameras, use a 2-D sensor to directly produce a 2-D image data representation of a physical media or scene. The image data may also include a sequence of digital images, such as those produced by a video camera, where each frame of the image sequence is treated as a separate image for the purpose of the present invention.

The terms "quality metric" and "quality measure" as used herein are interchangeable and describe some measurable characteristic of image quality that can be obtained from analysis of the digital image data. Thus, a quality metric or quality measure can be a characteristic such as dynamic range, brightness, noise, entropy, or other parameter that can be detected and measured using any of a number of techniques that are familiar to those skilled in the image analysis arts.

In the aforementioned U.S. Pat. No. 7,706,567 entitled "Assured document and method of making" by Robert J. McComb, a method is disclosed for generating an assured document using test targets interspersed within a document queue for documents that are to be scanned. The term "assured document" is intended to mean that a scanned document has been processed for enhanced security and content authentication so that (1) any tampering with the document data can be detected and (2) the image quality of the document data has been determined to be satisfactory and the quality measures have been secured. Tampering detection is achieved through the use of a digital signature that is calculated from the scanned document data and subsequently encrypted to render it secure. The image quality that is associated with a scanned document is measured using the test targets that are inserted periodically into the document queue for a scanning job. The measures of the image quality are also subject to encryption and hence are as secure as the digital signature. These two features provide a means to certify that a scanned document is free from malicious tampering and is a faithful rendition of the original physical document.

The method by McComb uses the scans of periodically inserted test targets as indicators of the image quality associated with scans of individual user document. There are implicit assumptions with this method, namely, the scanner configuration remains unchanged during the interval between the test targets and the document scanner is operating normally when scanning individual user documents. However, as described previously, quality losses may occur in individual images even when a scanner is operating as intended, and test targets may fail to capture these losses. Moreover, there can be many image digitization applications for which test targets are not readily available or usable.

Embodiments of the present invention overcome these limitations by reducing, or entirely eliminating, the need for test targets to assess image quality as part of the process of making assured images. The term "assured image" is an extension of the term "assured document" as used in the McComb application and, in the present invention, it specifically means that (1) any tampering with the image data can be detected and (2) the image quality of the image data has been assessed and the quality measures have been secured. The secure assurance of all images, regardless of their image quality, provides increased utility as compared to the assurance of images only when the quality is found to be sufficient, as was the case in the method by McComb. As an example, a digital video image sequence from a police surveillance camera may have some frames that have excellent quality, while other frames in the same sequence have poor quality. These poor frames could be the result of changes in lighting conditions, motion blur in moving objects, or intentional tampering. However, every frame in the sequence may be essential as evidence, and hence it is imperative to secure the image data and the quality measurements in every frame, regardless of the image quality.

Referring to FIG. 1, an example of the formation of an assured image in the context of an overall imaging system is shown. An entity in the physical world, whether a piece of media, an object, a person, or a scene, is captured by a digital imaging device, such as a document scanner 10, a digital still camera 11, a digital video camera 12, a motion picture film scanner 13, or any other generic digital imaging capture device 14 that produces image data 20 that is representative of a physical entity. An assurance process 30 receives this image data 20 and produces an assured image 40 that can be stored in a storage device 50 or transmitted to another location using a transmitter 51, which could use a wireless or wired connection in a standalone configuration or as part of a network.

Figure 2:
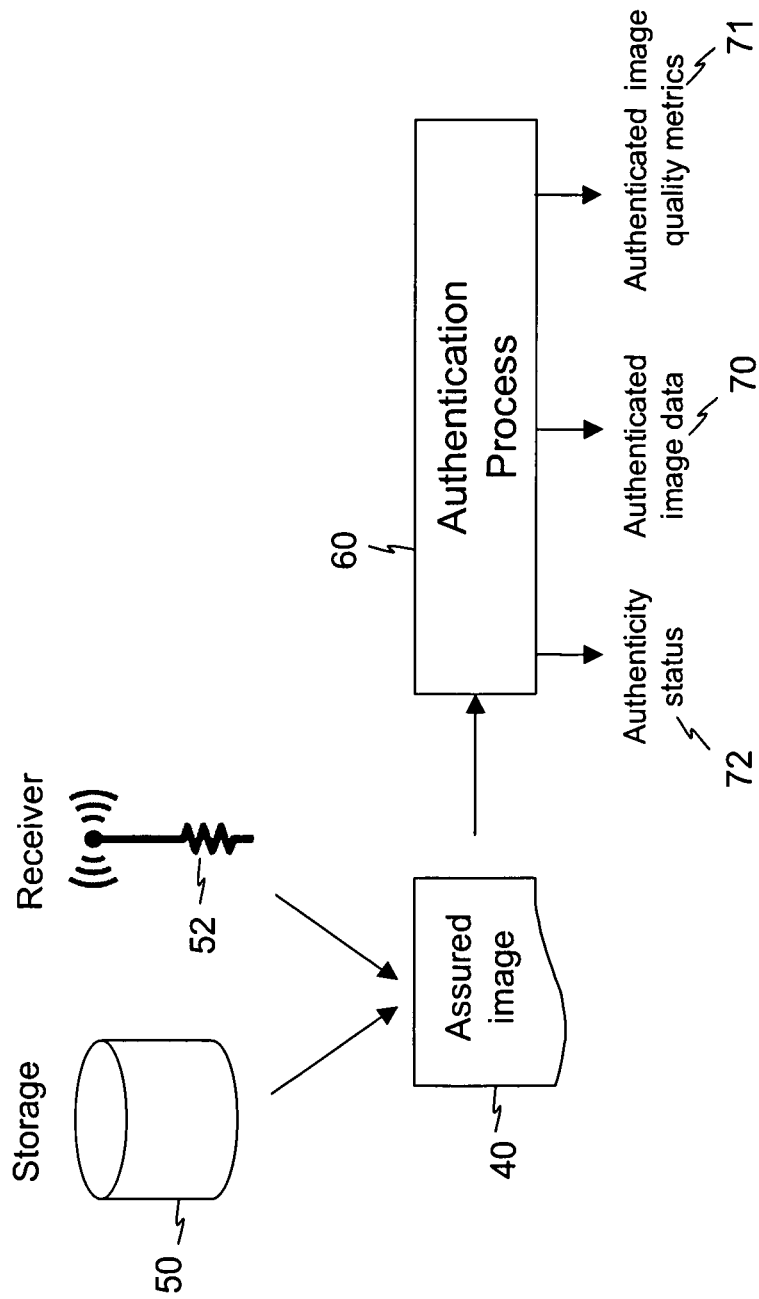
FIG. 2 is a block diagram overview of the image processing workflow for authenticating assured images with embodiments of the present invention.

Referring to FIG. 2, an example of the authentication of an assured image is illustrated. In this example, assured image 40 is retrieved from the storage device 50 or received by a receiver 52 and is sent to an authentication process 60. The assured image is analyzed within the authentication process to determine if any tampering has been done to the image data or to the quality metrics. The authenticity (or lack of authenticity) is indicated by an authenticity status signal 72 that is produced by the authentication process. Authenticated (i.e., non-tampered) image data 70 can then be used in any manner of image processing applications, including display or recording applications or automated analysis by a computer. Authenticated image quality metrics 71 are also available for use in various applications, such as controlling the routing of the authenticated image data to other processes or evaluating the performance of the image capture device, for example.

Assurance Process Using Only Image Data

Figure 3:
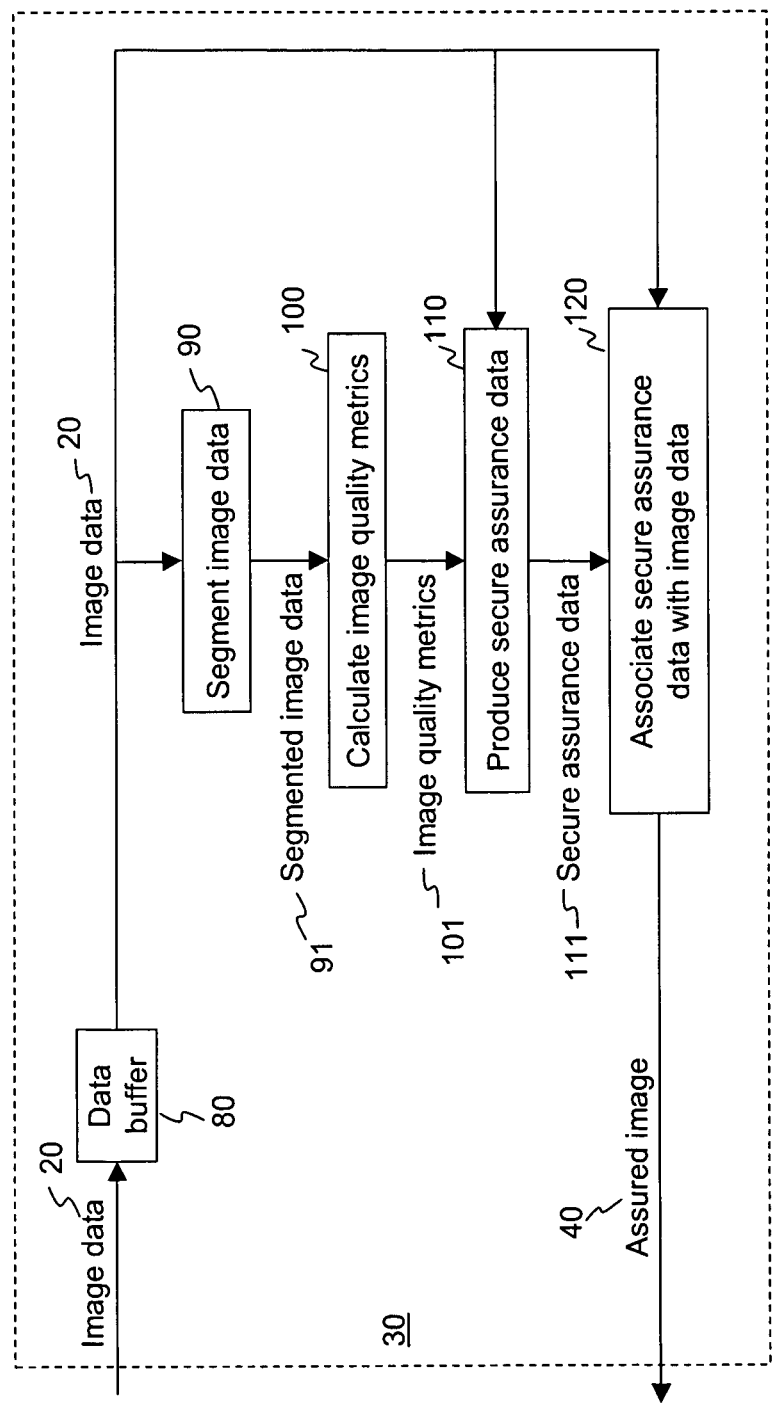
FIG. 3 is a block diagram illustrating an assurance process of the present invention.

Referring to FIG. 3, one embodiment of assurance process 30 is illustrated. In this embodiment, no test targets are used and only quality metrics that are calculated from the image data are used in producing an assured image. The following briefly describes the steps in this embodiment of the assurance process, and additional details are described subsequently.

Image data 20 is first stored in a data buffer 80 so that the image data can be accessed as needed by the components of the assurance process. Image data 20 is then sent to an image segmentation step 90 that segments the image data into one or more regions to produce segmented image data 91. These segmented regions contain portions of the image data corresponding to spatial regions on the digital image.

Segmented image data 91 is sent to an image quality metrics calculation step 100, where one or more quality metrics 101 are calculated for each segmented region. As described previously, these quality metrics are no-reference quality metrics because the only data that is available is the image data itself, without any reference image data such as would be provided by test targets.

Image quality metrics 101 and image data 20 are then sent to a secure assurance data production step 110, which produces secure assurance data 111. The secure assurance data provides the means for securing the image quality metrics and the image data against tampering, while also linking the quality metrics and image data so that any changes in the image data will render the image quality metrics as invalid.

Finally, secure assurance data 111 is associated with image data 20 using an assurance data association step 120 to produce an assured image 40. A variety of mechanisms can be used to form the association of the image data and the secure assurance data, as described subsequently.

Image Segmentation

The purpose of image segmentation step 90 is to identify spatial regions that have characteristics that are of particular interest and meaningful for assessing image quality. For example, an image might contain two types of content: text and photographs. The various quality metrics that are determined from the image data, such as noise levels, sharpness, and code value histograms, for example, may be quite different for the text and photograph regions of an image. By comparison, an image quality calculation that uses the image data for the entire image may not as readily indicate important changes in image quality. In addition, some quality metrics are not meaningful for certain types of image regions, for example, a sharpness metric is not relevant for a bi-tonal image.

Segmentation can provide any of a number of subsets of the image data, including the full set of image data, encompassing the entire image where necessary. Segmented regions can be spatially overlapping, non-overlapping, contiguous, or not contiguous. Moreover, the union of all segmented regions need not necessarily encompass the entire document. Segmentation can be based upon the characteristics of a region or on specific physical location(s) within the document. Regions may or may not be rectangular.

Figure 4:
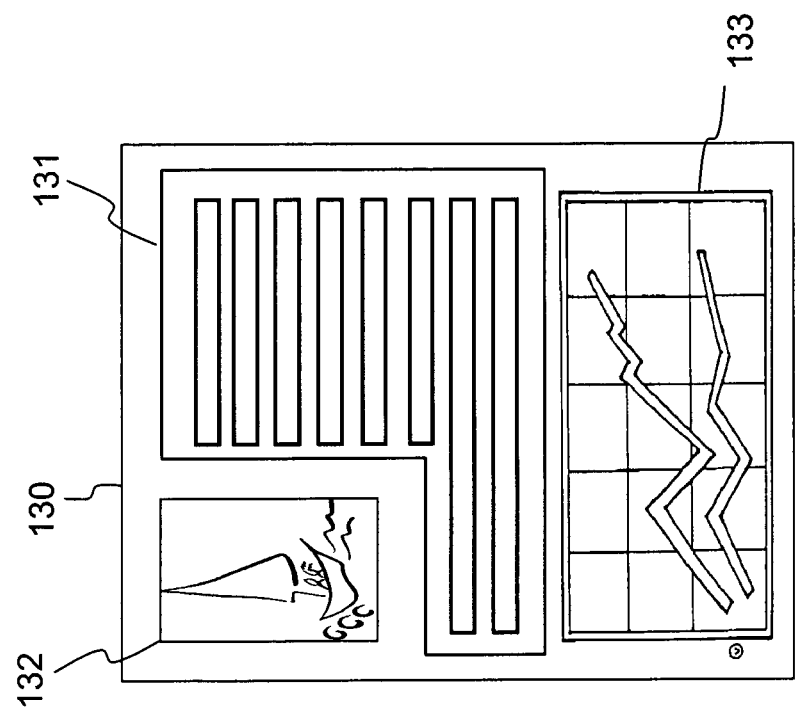
FIG. 4 is an example of spatial regions in a compound document.

By way of example, FIG. 4 illustrates an example of a compound document 130 that includes regions of various types. Compound document 130 includes a text region 131, a photograph region 132, and a graphics region 133. In this example, the regions that are used to calculate quality metrics could include the entire document 130, the text region 131, the photograph region 132, and/or the graphics region 133, or portions of one or more of these regions.

Automated methods for performing this type of segmentation within compound documents are well known to those skilled in the art. A good example of a technique for performing such segmentation is described in U.S. Pat. No. 5,767, 978, by Revankar et al., entitled "Image segmentation system", issued Jun. 16, 1998. In this patent and in the example of FIG. 5, the segmented regions are based on rectangular blocks of pixels, which is generally a convenient arrangement. However, it is noted that the regions may also have arbitrary shapes that can be determined using any of a wide range of segmentation techniques that have been described in the literature and are familiar to those skilled in the image processing arts.

Figure 5:
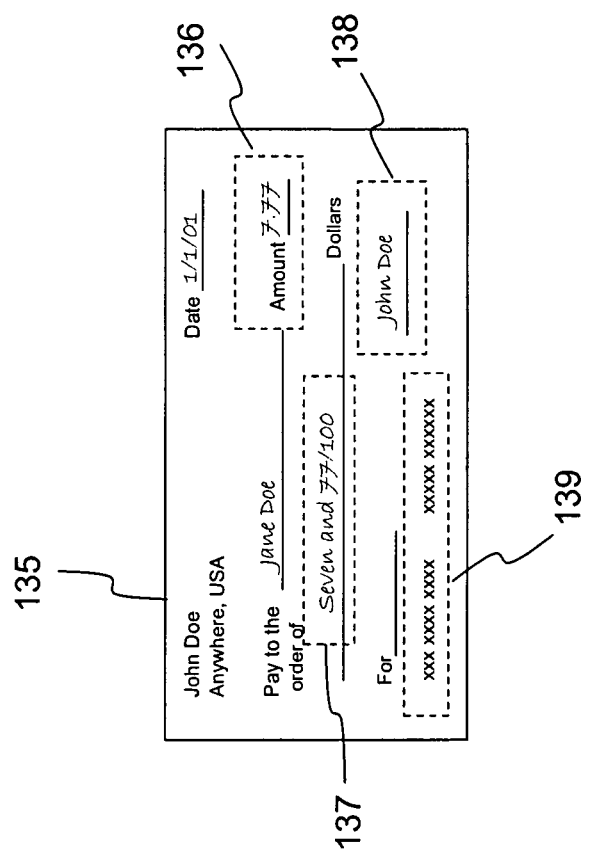
FIG. 5 is an example of spatial regions in a bank check.

Regions within images may also have fixed or predictable positions. FIG. 5 illustrates an example of a bank check 135 that includes a convenience amount region 136, a legal amount region 137, a signature region 138, and a MICR (Magnetic Ink Character Recognition) region 139. For this type of document, these regions are largely fixed in position, and the segmentation might be performed by simply specifying coordinates of the regions within the scanned document image. Each of these regions on a bank check may have varying importance to a financial institution, as well as having different characteristics for symbols or characters, such as handwritten characters versus machine characters. Where such differences exist, it may be advantageous to determine the image quality of each region separately, using different quality measures appropriate to the characteristics of the region.

Image Quality Metrics

One example of a no-reference image quality metric is the blur metric, as previously mentioned in the Marziliano et al. article that was noted earlier in the background section. Other examples include the quality metrics for Check 21 applications as described by the FSTC at the FSTC site. Other examples of no-reference image quality metrics include the following:

(i) dynamic range (for example, computed from maximum image code value-minimum image code value);
(ii) average brightness (for example, computed from the average image code value);
(iii) noise (for example, computed from the code value variance in flat image regions); and
(iv) entropy (calculated from the code value histogram).

Still other suitable no-reference metrics could also be used. The computation of relevant no-reference image quality metrics is currently an active research area in academia and industry, and the present invention can easily take advantage of any advances in the field.

Representation of Image Quality Metrics

The image quality metrics could be represented by simply concatenating data fields of known length in a pre-defined ordering, for example, 56 bits for the first quality metric value, 19 bits for the next quality metric value, and so on for the remaining quality metrics in the segmented image regions. The number of bits may be different for each quality metric depending on the type of data that is represented and the precision that is needed to represent the data (for example, short integer, long integer, float, double, etc.). However, because there may be a variable number of image regions and a variable number of quality metrics for each region, a more flexible and more easily interpreted structure is desirable when representing the image quality metrics.

One method for compactly representing the image quality metrics is key-length-value packing, which is a well-known technique that is used in many image formats for header information and other metadata. The key is defined as a unique identifier for the data that follows the key. The length is defined as the amount of data that follows the key, and the length may vary with the key. Finally, the value is defined as the actual data. Keys are predefined for each type of quality metric, and the value includes data that identifies the image region, followed by data for the image quality metric itself. Key-length-value data is usually byte-aligned for ease in parsing the data, so the key, length, and value are always represented with an integer number of bytes. To assist in parsing the data, the key is usually prefixed with a reserved marker, such as the all-ones byte, denoted as "FF" in hexadecimal notation.

Figure 6:
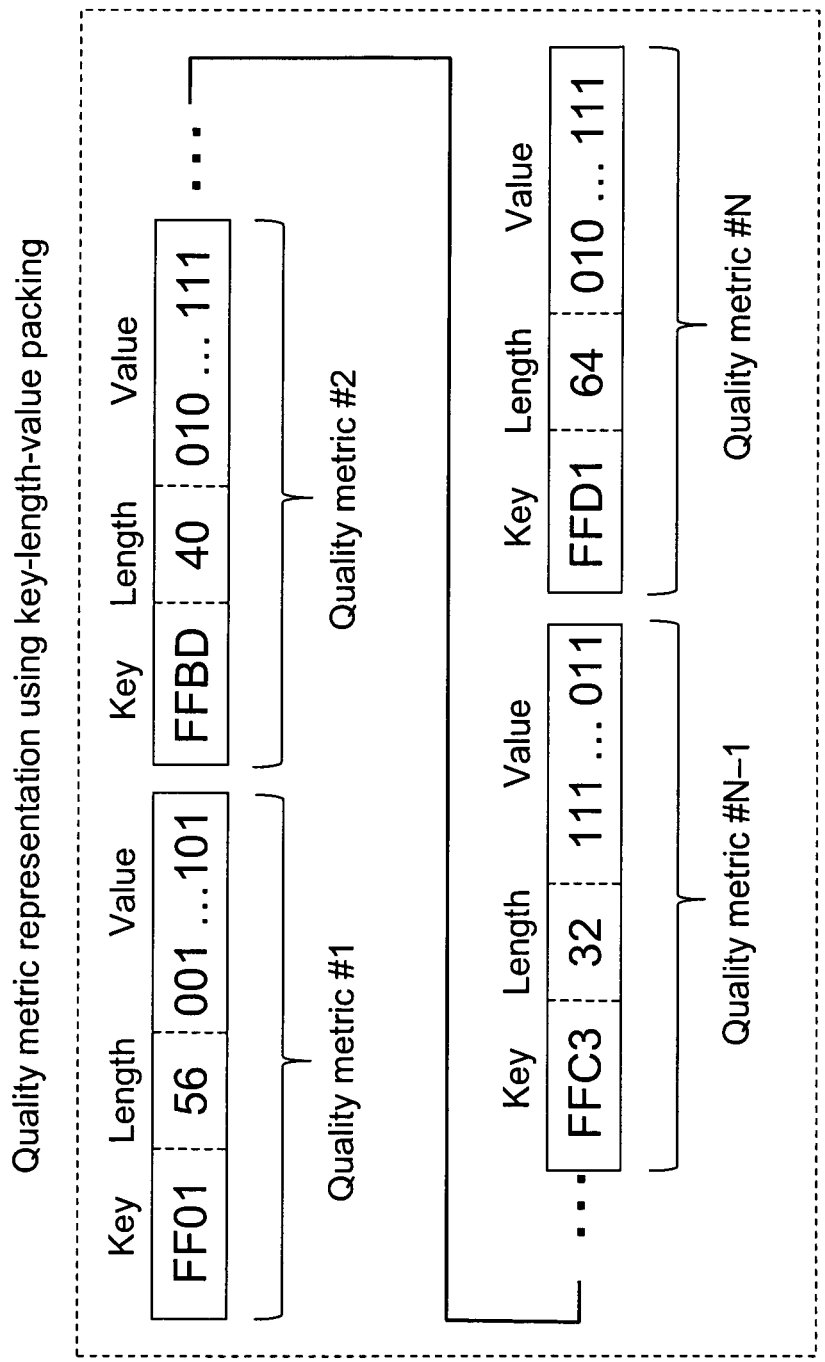
FIG. 6 illustrates an example of assurance data formed using key-length-value packing.

An example of key-length-value packing for the image quality metrics is shown in FIG. 6. In this example, the first quality metric is denoted with the 2-byte key "FF01" (in hexadecimal notation), and the length is 56 bits, which includes two bytes (16 bits) to represent the length parameter plus 40 bits to represent the quality metric value. The quality metrics have different lengths depending upon the nature of the quality attribute that they are measuring, and FIG. 6 illustrates three other quality metrics out of a total set of N quality metrics, denoted by the keys "FFBD", "FFC3" and "FFD1", with lengths of 40, 32, and 64 bits, respectively. The quality metric values might correspond to a noise standard deviation, a dynamic range, and a sharpness measure, for example. The key-length-value representation can be easily extended to handle any number of quality metrics.

Additionally, it is possible to define various fields within the value portion of a key-length-value grouping. Because there may be a plurality of segmented image regions, each with its own quality metrics, it is necessary to identify the image region that is associated with a given quality metric. This can be accomplished by identifying the type of region with a field within the value parameter for a quality metric. For example, the first 8 bits of the value can identify the type of region according to predefined classes such as text, photograph, graphics, bi-tonal, background, and foreground. Alternatively, it may be advantageous to identify the spatial region explicitly by specifying the region position and size, using a predefined coordinate system and description language. Note that the descriptions of the spatial regions can also be accomplished by allocating key-length-value descriptors for each region prior to specifying any quality metrics, thus defining the regions once within the packed bits of the assurance data for greater data efficiency.

Secure Assurance Data

Figure 7:
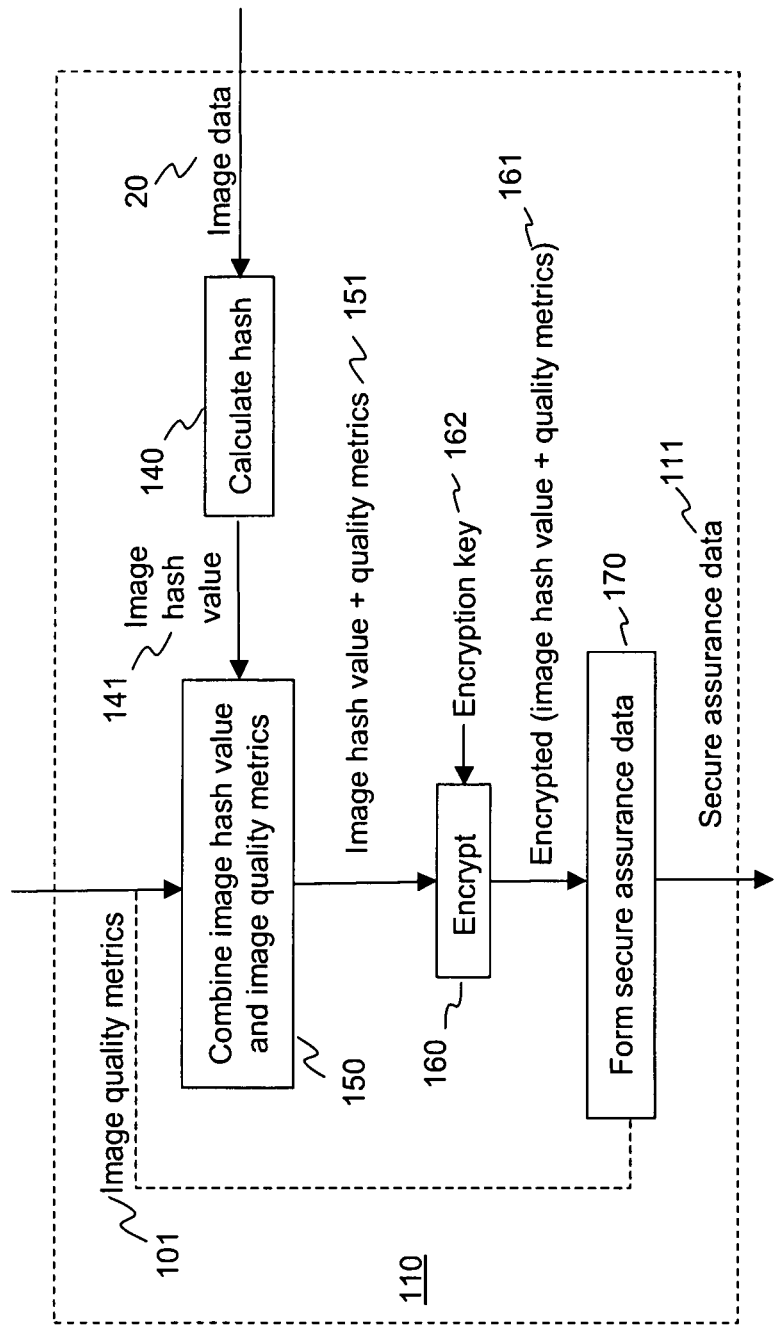
FIG. 7 is a block diagram showing a first embodiment of a method for producing secure assurance data with the present invention.

Referring to FIG. 7, a first embodiment of the secure assurance data production step 110 is illustrated. Image data 20 is sent to a hash calculation step 140, which produces a hash value 141 for the image data. Image hash value 141 and image quality metrics 101 are combined in a combination step 150 to produce assurance data 151 that consists of the combined image hash value and the image quality metrics. The assurance data is then secured by an encryption step 160 using an encryption key 162 to produce encrypted assurance data. Encrypted assurance data 161 can optionally be combined with unencrypted image quality metrics 101 in a secure assurance data formation step 170 to provide convenient access to the image quality metrics at any time without the need for a decryption step. These unencrypted image quality metrics can always be verified by referring to the encrypted image quality metrics that are part of the encrypted assurance data. Encrypted assurance data 161, with or without the unencrypted image quality metrics 101, forms secure assurance data 111.

Figure 8:
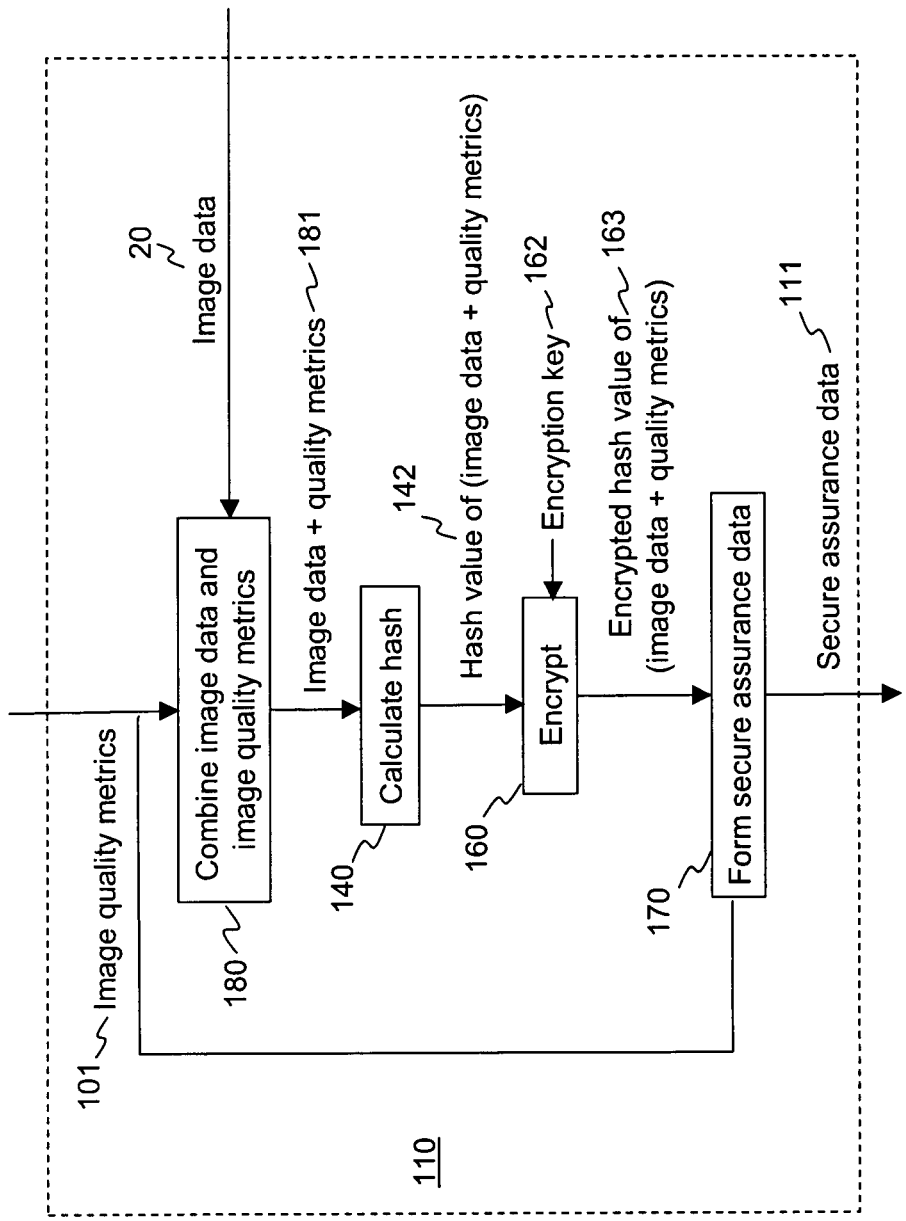
FIG. 8 is a block diagram showing a second embodiment of a method for producing secure assurance data with the present invention.

Referring to FIG. 8, a second embodiment of secure assurance data production step 110 is illustrated. In this embodiment, image data 20 and the image quality metrics 101 are combined in a combination step 180. The combination of the image data and quality metrics can be accomplished in a variety of ways, such as concatenating the image data and the quality metrics in a predefined order. Combined image data and quality metrics 181 are then sent to a hash calculation step 140 that produces a hash value 142 that represents the assurance data for the combined image data and quality metrics. Hash value 142 for the combined image data and quality metrics is then secured with an encryption unit 160 using an encryption key 162 to produce an encrypted hash value 163 that represents secure assurance data for both the image data and the quality metrics. In this embodiment, quality metrics 101 are always included in the secure assurance data using a secure assurance data formation step 170. This is necessary because the hash value provides only a distilled representation of the quality metrics, and the full quality metrics must be made available for use in any subsequent processing that involves the quality metrics.

Hash Value Calculation

An example of the algorithm that can be used in hash calculation step 140 is the Secure Hash Algorithm (SHA-1) of the U.S. National Institute of Standards and Technology (NIST). SHA-1 is well known to those skilled in the art, and a detailed description of SHA-1 is contained in Federal Information Processing Standards Publication 180-1 (Apr. 17, 1995). This Standard specifies an algorithm for computing a condensed representation of a message such as a data file. When a message of any length $<(2^{64})$ bits is input to the algorithm, SHA-1 produces a 160-bit output called a message digest. SHA-1 is called secure because it is computationally infeasible to find a message which corresponds to a given message digest, or to find two different messages that produce the same message digest. Any change to a message will result, with very high probability, in a different message digest.

The message digest, or equivalently the hash value, that is produced by SHA-1 is a distilled representation of the image data (or the combined image data and quality metrics). It forms the basis for a digital signature that can be used to detect any tampering with the image data (as well as the quality metrics in the second embodiment of secure assurance data production step 110). The same hash algorithm must be used by the verifier of a digital signature as was used by the creator of the digital signature. Forming a digital signature by encrypting the hash value, rather than encrypting the image data (or the combined image data and quality metrics), improves the efficiency of the encryption process because the hash value is typically much smaller in size than the image data.

Encrypting the hash value preserves the security of the image data while still allowing a user to view the image without the burden of decrypting the image data. Likewise, the hash value for the combined image data and quality metrics provides the security for both the image data and the quality metrics, with the advantage that any change to the image data will also render the image quality metrics as invalid because the hash value will have changed. However, a potential disadvantage of the hash value for the combined image data and quality metrics is that any change to the quality metrics will also render the image data as invalid.

Encryption

In one embodiment of the present invention, encryption of the assurance data in encryption step 160 (FIG. 2) is performed using a private encryption key of a public/private key pair system, such as is used in well-known PKI systems. By signing the assurance data with a private key, which is associated with a specific individual, organization, process, or device, the provenance of the assurance data is known (i.e., non-repudiation). Secure assurance data 161 may be used by anyone using the corresponding public key so that the quality and the integrity of the image data can be verified easily at any time. However, there may be applications where it is desirable to use only private keys (symmetric encryption) or even to use the public key of a public/private key pair to encrypt the assurance data.

It is noted that the assurance process that was just described does not include encryption of the image data itself. Encryption can be computationally expensive for large amounts of data, such as is the case for high resolution images and video sequences. In contrast, the assurance data represents only a small amount of data, which can be encrypted easily. Moreover, it may be desirable to leave the image data in unencrypted form so that it can be accessed by users without the need for decryption or for the infrastructure that is required for decryption key management. Still, it is recognized that some applications will require the image data to be encrypted to prevent unauthorized access to the contents of the image, such as for financial, legal, medical, and defense applications. The methods of the present invention for assessing image quality and linking it with the image data can be used whether or not the image data is also encrypted.

Assured Data Association

Figure 9:
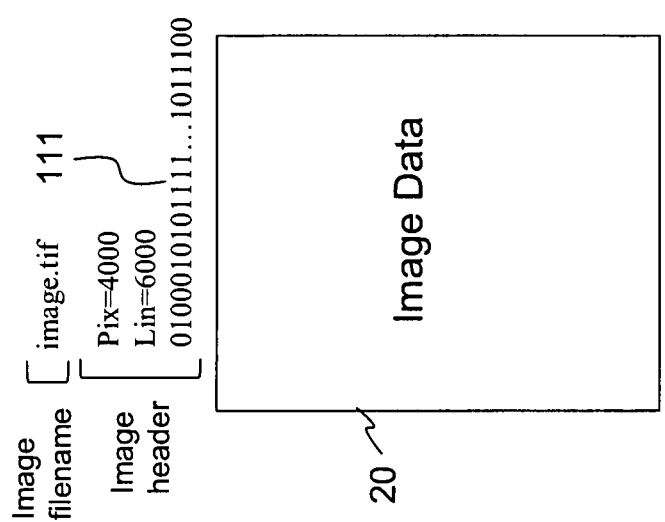
FIG. 9 illustrates placing secure assurance data bits in an assured image header.

The association of image data 20 and secure assurance data 111 can be achieved in a variety of ways in assurance data association step 120 (FIG. 3). In one embodiment of the present invention, the encrypted bits that represent secure assurance data 111 are stored in the header of the digital image file that contains image data 20 as shown in FIG. 9. For example, TIFF and many other image format specifications have provisions for user-defined data storage in the image header.

Figure 10:
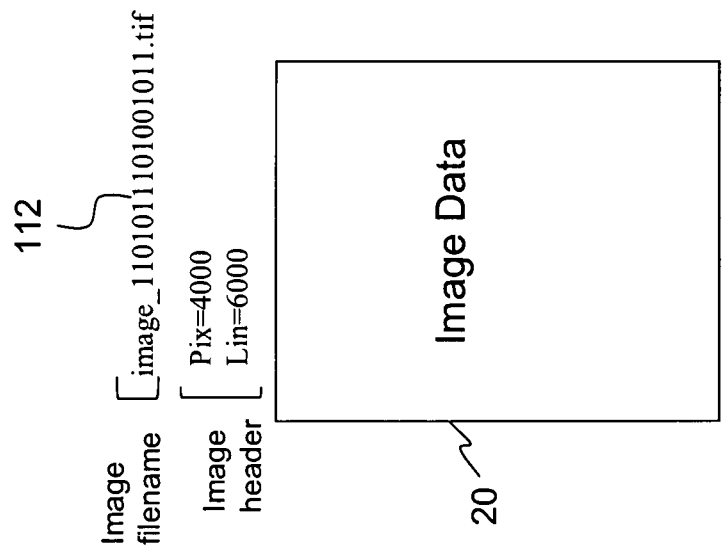
FIG. 10 illustrates placing a unique identifier for secure assurance data bits in an assured image filename.

Alternatively, secure assurance data 111 may be sent to a local or remote database, and the image header or image filename can contain a unique reference value that is associated with the corresponding entry in the database. The use of a database to store the assurance data is advantageous when the amount of assurance data is too great to be efficiently stored directly in the image header. FIG. 10 shows an example of a unique reference value 112 (denoted by the 16-bit string "1101011101001011") for the secure assurance data embedded in the TIFF file name example "image1101011101001011.tif".

Figure 11:
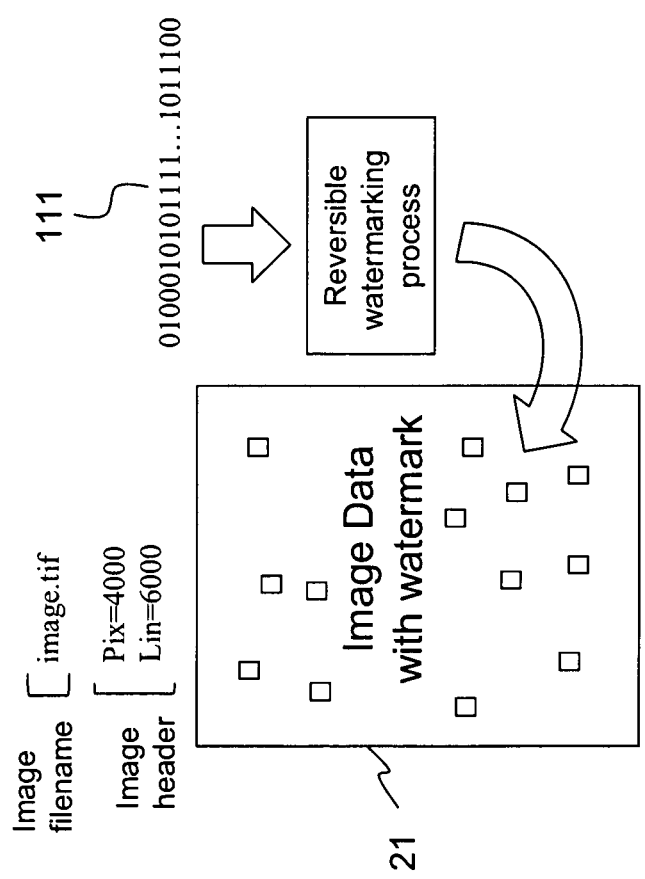
FIG. 11 illustrates placing secure assurance data bits in an assured image using a reversible watermarking process.

The association of secure assurance data 111 with image data 20 can also be achieved using the method described in U.S. Pat. No. 5,912,972 to Barton, entitled "Method and apparatus for embedding authentication information within digital data" where the secure assurance data is directly embedded into the image data itself in a way that avoids detection by a casual observer, thereby preventing anyone from separating the assurance data from the image data. FIG. 11 illustrates an image file with watermarked image data 21 that contains secure assurance data 111. More generally, reversible watermarking techniques, such as those described in U.S. Pat. No. 6,895,101 to Celik et al., entitled "System and method for embedding information in digital signals" and U.S. Pat. No. 7,006,662 to Alattar et al., entitled "Reversible watermarking using expansion, rate control and iterative embedding" can be used to embed the assurance data into the image data, yet still allow the image data to be recovered and authenticated. Unlike image file embodiments shown in FIGS. 9 and 10, an image file prepared in this way would be no different from a conventional image file in outward appearance.

Because watermarking techniques usually involve a secret key in the embedding process, there is an inherent element of security with these techniques, which may be used to supplant or to supplement the encryption of the assurance data. In some embodiments, the assurance data can be embedded into the image data itself using watermarking techniques, without the need for separate encryption of the assurance data.

Assurance Process with User Notification and Exception Handling

In one embodiment of the method by McComb, the digitization process is terminated if one or more predefined quality specifications are not met. However, in many applications, such as a high speed/high volume scanning application for example, stopping the digitization process would be impractical and inefficient. Because the present invention includes quality metrics for each individual image, it is possible to monitor the quality metrics to determine whether or not a quality failure is isolated to a single image or if there is a general failure that affects many images. As a result, another embodiment of assurance process 30 in the present invention does not terminate the scanning process in the event of a quality failure, but instead simply notifies the user of the failure through various methods, such as displaying a highlighted or color-coded document filename on a Graphical User Interface (GUI) display. A user can then deal with these quality failures at a time and in a manner that is convenient and efficient.

Figure 12:
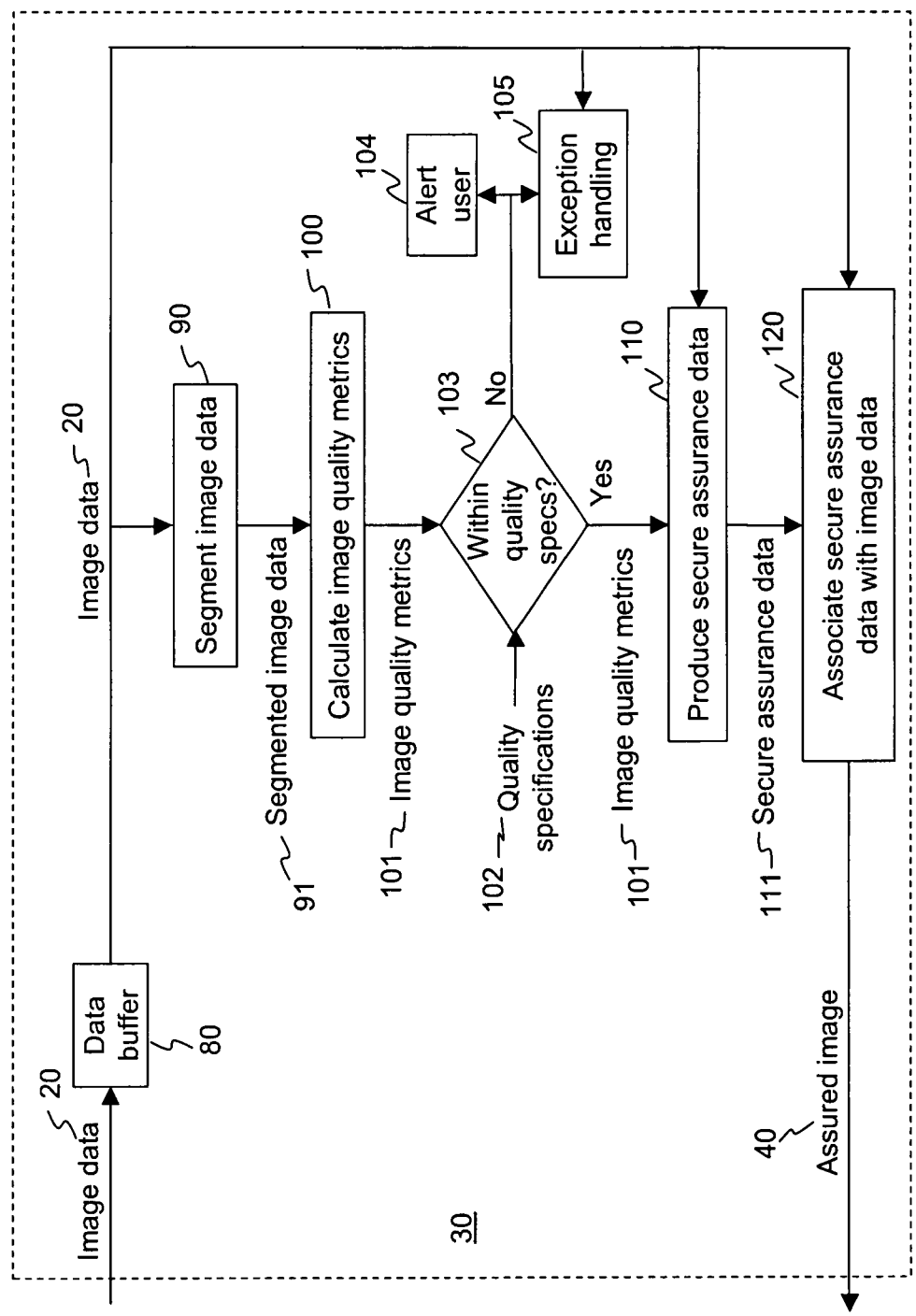
FIG. 12 is a block diagram illustrating the assurance process of the present invention that performs a quality comparison using predetermined quality specifications.

This embodiment of assurance process 30 uses the previously described steps, but also includes additional steps to alert a user and perform exception handling if the assessed image quality is not within predetermined quality specifications. For example, a user can be alerted if the noise level of image is beyond a desired level, or if the average code value of an image is very low, perhaps indicating a poor exposure or a sensor failure. Referring to FIG. 12, image quality metrics 101 that are produced by image quality metrics calculation step 100 are compared to quality specifications 102 using a quality specification comparison step 103. Quality specifications 102 are predetermined through analysis or experimentation, or they may be provided by a user or a digital image acquisition device manufacturer. Imageegmentation step 90 that produces segmented image data 91 is beneficial in helping to establish robust quality specifications as the segmented image regions are more likely to have consistent statistical properties across different images. Thus, image quality specifications 102 are preferably defined for each type of image region that is expected in the intended application.

If image data fails to meet the quality specifications in quality comparison step 103, the user is notified by a user alert step 104 that sends an alert signal that can include a visual display, a sound, an entry in a log file, or other means of informing a user of a quality issue. Subsequent actions for an image with a detected quality failure are then handled by an exception handling step 105, where image data 20 could undergo further quality analysis or be earmarked for visual inspection. In cases where the source of the image data is still available, such as a document for example, the exception handling can also include the production of new image data, for example, by rescanning the document. If the measured image quality meets the quality specification, an assured image is created by producing secure assurance data and associating the secure assurance data with the image, using the methods that were described previously.

Assurance Process Using Both Image Data and Test Target Data

Another embodiment of the present invention produces assured images using quality measures that are derived from a combination of the image data and test target data. The combined use of test target quality metrics and individual document quality metrics for the assurance data provides the benefit of assessing both (i) overall system quality capability and (ii) quality performance for an individual image. Overall system capability assessment, provided using known test targets as described in the McComb disclosure, determines whether or not the image capture process itself is operating at the desired level of quality. Individual image quality assessment provides quality metrics that apply separately to each image. The quality performance for a given individual image will be less than or equal to the system capability.

Figure 13:
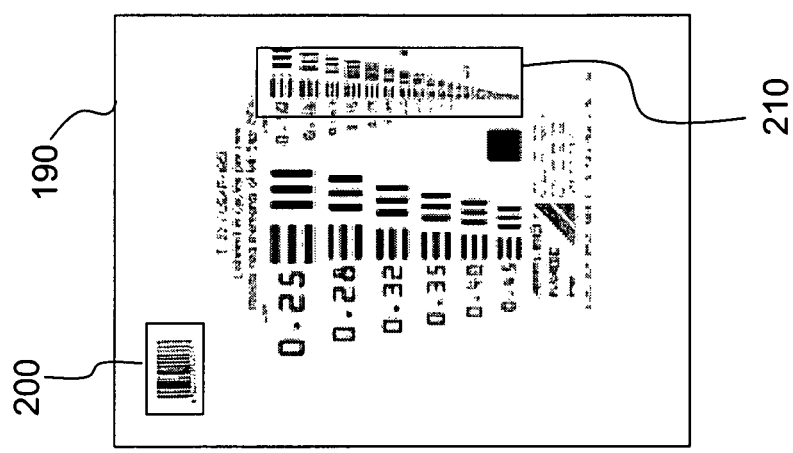
FIG. 13 illustrates an example of a test target with a bar code and a test target image fragment.

Test targets can be used in the manner as described in U.S. Pat. No. 7,706,567 by McComb, where test targets are placed into a document queue at periodic intervals. In the method by McComb, the test targets are detected by analyzing the image data for special markings that identify the test target, such as a barcode that is placed in a predefined region of the test target, for example. FIG. 13 provides an example of a test target 190 that contains a barcode region 200. Barcode detection is well known in the imaging arts. However, placing the bar code in a known region reduced the amount of computation that is needed to find it.

Figure 14:
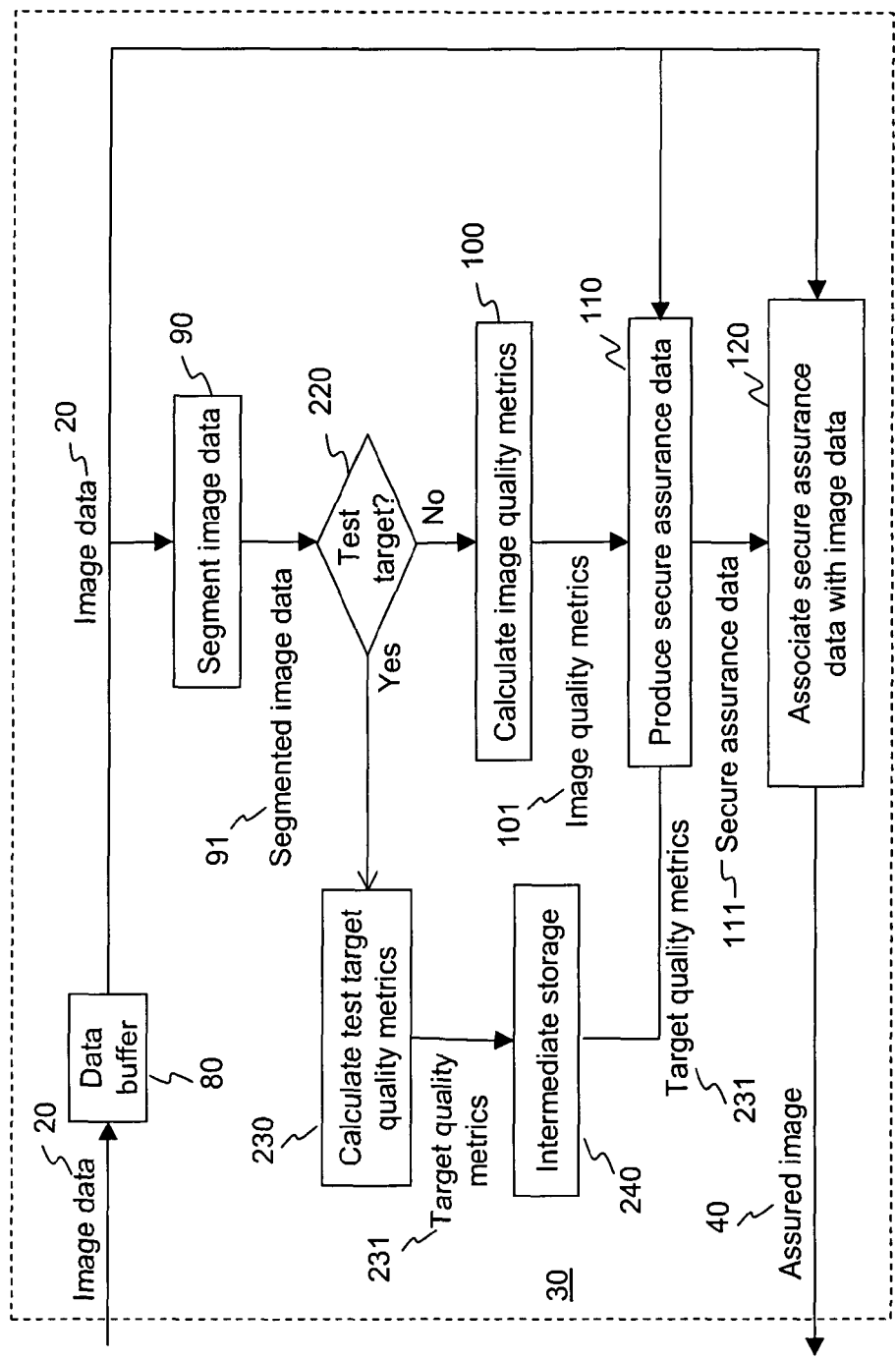
FIG. 14 is a block diagram showing the assurance process of the present invention that includes test target quality metrics.

Referring to FIG. 14, this embodiment of assurance process 30 uses image segmentation step 90 to segment the predefined bar code region from the image data 20. In the same segmentation step, other segmented regions can be produced as described previously. The bar code region is then analyzed with a test target detection step 220 to determine if the bar code region contains a test target bar code. If the test target bar code is present, the segmented image data is sent to a test target quality metrics calculation step 230 that calculates one or more test target quality metrics 231. The test target quality metrics are then stored in intermediate storage 240 so that the test target quality metrics can be accessed for subsequent use in forming secure assurance data for image data that is not test target data. Test target quality metrics 231 are combined with image quality metrics 101, for example, using key-length-value packing. Both the image quality metrics and the test target quality metrics are then used to produce secure assurance data 111, using the methods that were described previously. It is noted that it is also possible to form an assured image for the image data that represents a test target.

Test Target Quality Metrics

The art and science of measuring image quality using test targets is well known and is a relatively mature field. U.S. Pat. No. 7,706,567 to McComb describes examples of test target quality metrics, which include such quality metrics such as modulation transfer function (MTF), noise, dynamic range, and, for color scanners, color fidelity. Exemplary test target components are readily available to measure these basic quality metrics, as well as other metrics. Some targets are optimal for photographic imaging systems, and others are optimal for text or binary types of scanning systems. Test targets are available from a number of sources, including some with accompanying software to assist in interpreting the results of the targets. Table 1 lists some quality metrics and associated targets that can be used for their assessment.

TABLE 1

Quality metrics and associated test targets.

| Quality metric | Type of target |
| --- | --- |
| Resolution (MTF) | Sine wave pattern or knife-edge target |
| Noise | Gray scale step (wedge) target or uniform gray patch |
| Tone reproduction | Gray scale step (wedge) target |
| Color reproduction | Color reproduction target |
| Dynamic range | Gray scale step (wedge) target |
| Flare | Uniform gray patch |
| Artifacts | Gray scale step (wedge) target or resolution charts |

Image segmentation step 90 can identify regions in the test target to compute these various quality metrics by, for example, finding a blank area of the target to measure noise, finding an edge area to measure MTF, and finding grayscale patches to measure tone reproduction. The calculation of the test target quality metrics continues by measuring, for example, noise by calculating the standard deviation within the blank area, MTF by performing an edge analysis, or tonal reproduction values by calculating the average gray level in the grayscale patches. Literature in the imaging arts describes a number of ways to perform these measurements, and methods for automated processing and reporting of these metrics are well known to those skilled in the art of image processing.

Figure 15:
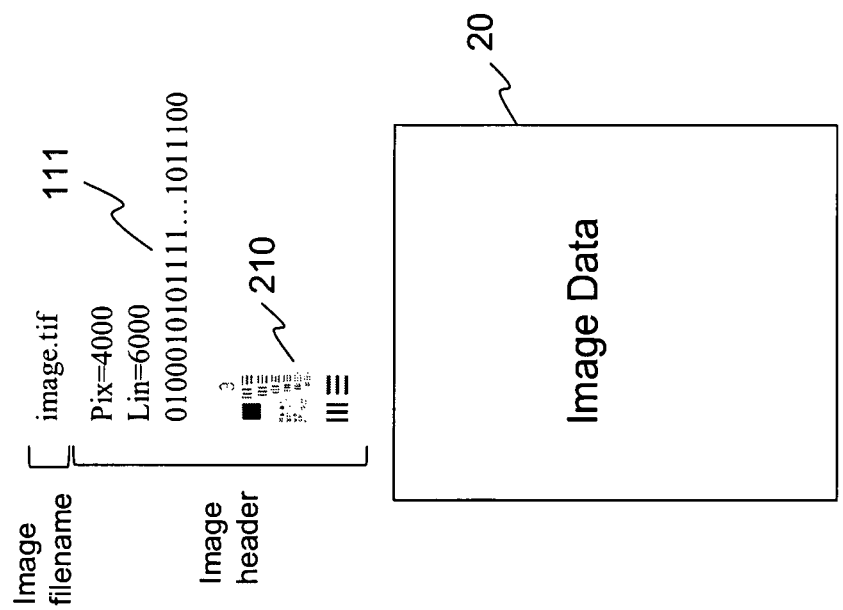
FIG. 15 illustrates placing secure assurance data and a test target image fragment in an assured image header.

In one embodiment of the method by McComb, calculated test target image quality metrics 231 that are stored in intermediate storage 240 include only the resultant metrics, such as noise level or MTF, for example. In another embodiment of the method by McComb, intermediate storage 240 may contain target quality metrics 231 and also test target image fragments that were used to calculate the metrics. The concept of using an image fragment can be understood by referring to FIG. 13. By test target image fragment 210, it is meant that a relevant region of test target 190 is cropped out of the target and the cropped image data is included in secure assurance data 111 The value of including test target image fragment 210 in the secure assurance data is that image quality measurements can be made later, using possibly a plurality of image quality metrics, providing even greater assurance for the quality of the image data. Securing the test target image fragment, or a hash value for the test target image fragment, with encryption can prevent an unscrupulous entity from changing the test target image fragment without detection of this change. Some file format specifications (such as TIFF) also allow for thumbnail images to be included, or for more than one image to be included in a single file. As shown in FIG. 15, a test target image fragment 210 can be included easily within the file header in these formats, along with secure assurance data 111.

The test target quality metrics can also undergo a comparison against predefined quality specification as described previously and illustrated in FIG. 12 for the embodiment that only used image data. Test target quality metrics 231 can be sent along with image quality metrics 101 to quality comparison step 103, where quality specifications for the test target metrics have been predetermined through analysis or experimentation, or they may be provided by a user or a digital image acquisition device manufacturer.

Authentication of Image Data and Quality Metrics

Figure 16:
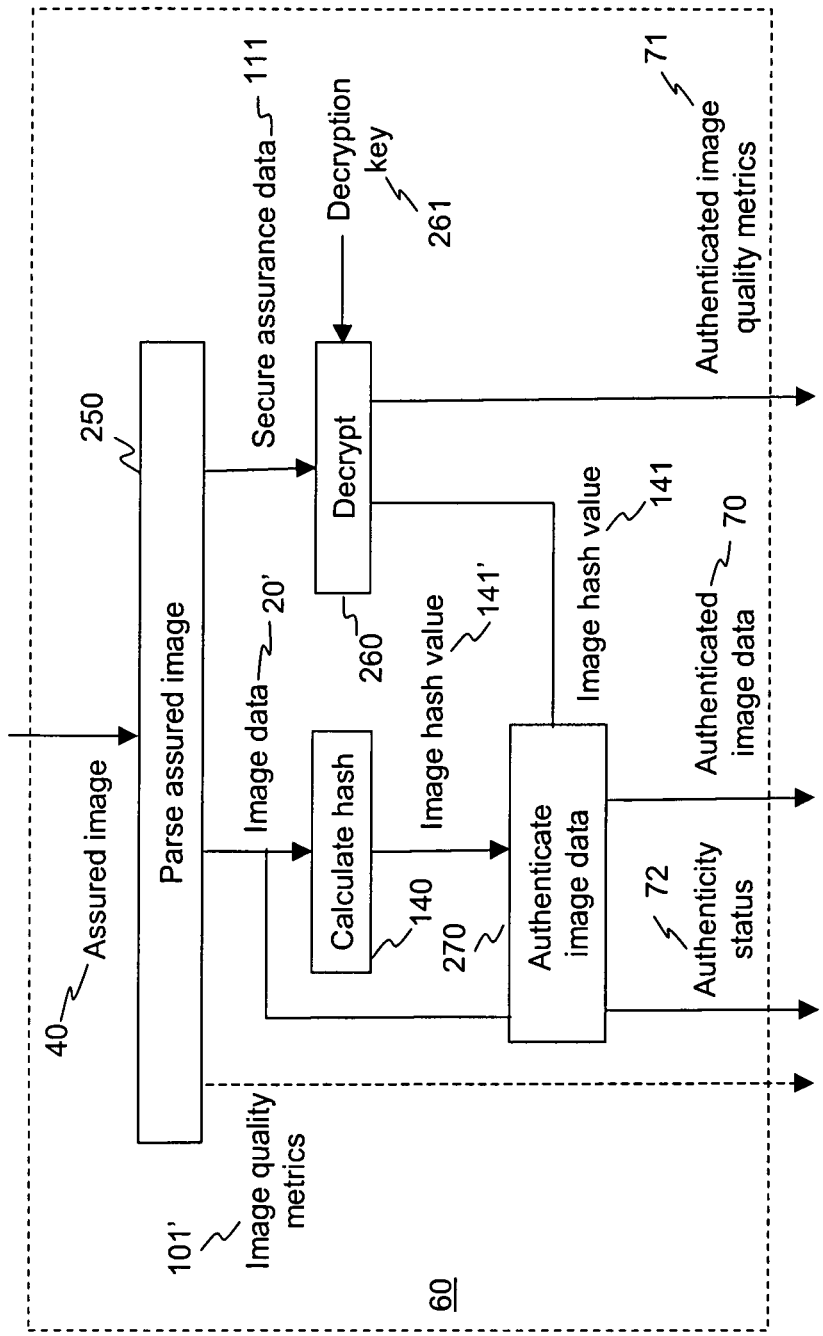
FIG. 16 is a block diagram showing a first embodiment of a method for authenticating an assured image with the present invention.

The image data and the image quality metrics of an assured image can be easily authenticated at any time using the secure assurance data. Referring to FIG. 16, an embodiment of authentication process 60 is shown for secure assurance data that includes an image hash value and quality metrics, as was described previously and shown in FIG. 7. Assured image 40 is separated into image data 20' and secure assurance data 111 using a parsing step 250. The prime symbol (') indicates that image data 20' may be different from image data 20 that was used in the assurance process, for example, due to tampering. Assured image 40 may also contain unencrypted image quality metrics 101', which, like the image data, may or may not be the same as image quality metrics 101 that were used to form the assured image. Image data 20' is then used to calculate an image hash value 141', where the prime symbol (') again indicates that this image hash value may be changed from image hash value 141 that was produced in the assurance process. Secure assurance data 111 is decrypted using a decryption step 260 with a decryption key 261. In one embodiment, the decryption key is the public key of a private/public key pair. Alternatively, the decryption key might be a private key, depending upon the type of encryption that was used in forming the secure assurance data. The output of decryption step 260 is image hash value 141 and authenticated image quality metrics 71. Image hash value 141 from the secure assurance data is then used to authenticate image data 20' by comparing image hash value 141 with image hash value 141' using an authentication step 270. If the two image hash values are the same, image data 20' is output as authenticated image data 70. If the two image hash values are different, image data 20' has been changed in some way from the original image data 20, and image data 20' is not authenticated. The authentication process provides an indicator of the authenticity (or lack of authenticity) by outputting an authenticity status signal 72, which can be used to inform a human user through a GUI, for example, or to control the workflow for the assured image, for example, routing a tampered image to an exception handling process.

While authenticated image quality metrics 71 are always free from tampering because of the encryption, they are not indicative of the quality of tampered image data and generally cannot be used when the image data cannot be authenticated. However, some restricted applications still can make use of quality metrics without necessarily having proper image data, such as monitoring the image quality of a capture device, for example.

Figure 17:
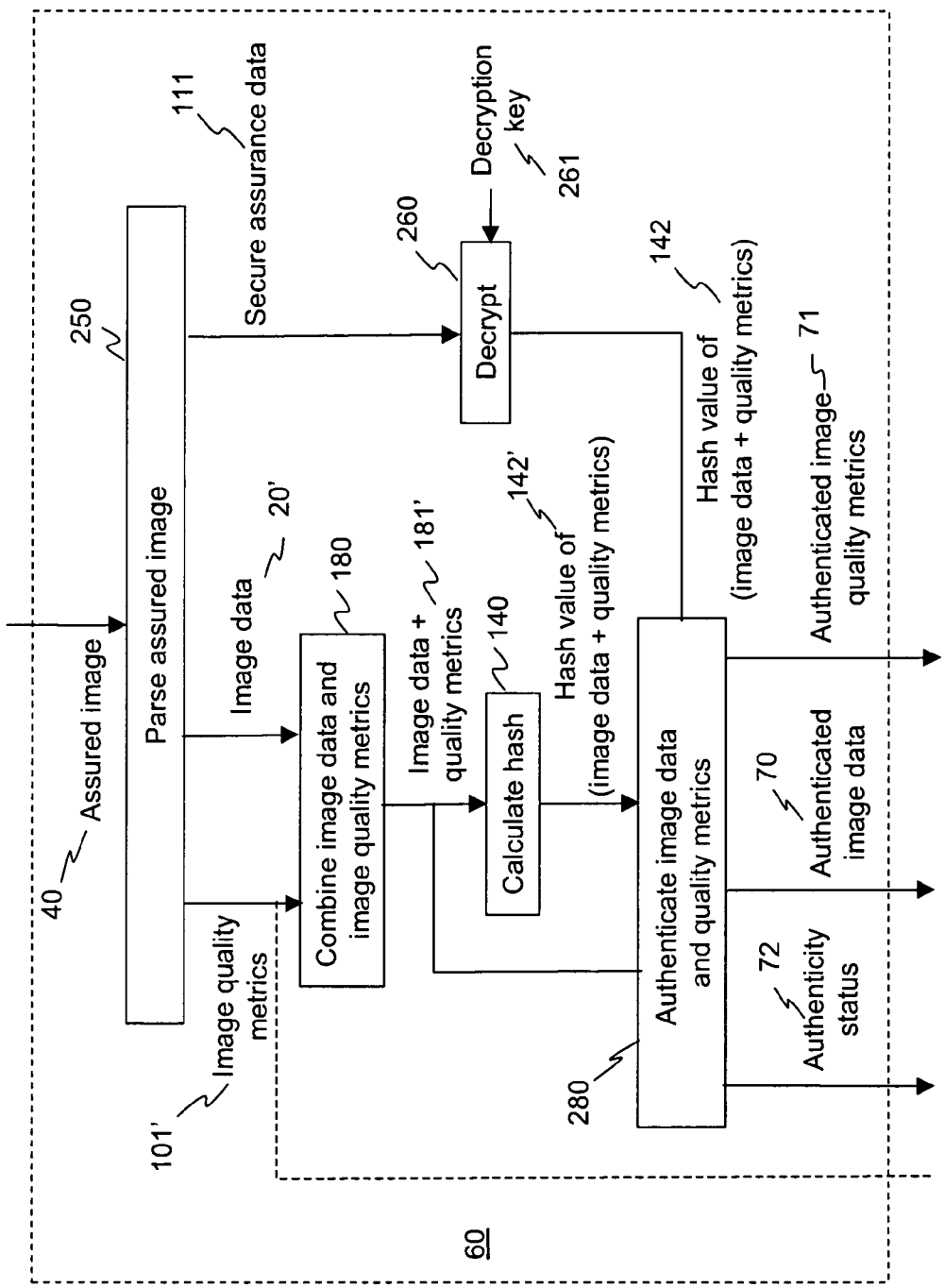
FIG. 17 is a block diagram showing a second embodiment of a method for authenticating an assured image with the present invention.

Referring to FIG. 17, an embodiment of authentication process 60 is shown for secure assurance data that includes a hash value for (image data+quality metrics), as was described previously and shown in FIG. 8. Assured image 40 is separated into image quality metrics 101', image data 20', and secure assurance data 111 using a parsing step 250. As described in the previous embodiment, image data 20' and image quality metrics 101' may or may not be the same as image data 20 and image quality metrics 101 that were used to form the assured image. Image data 20' and image quality metrics 101' are then combined using combination step 180. Combined image data and quality metrics 181' are sent to a hash calculation step 140 that produces hash value 142'. Secure assurance data 111 is decrypted using decryption step 260 with a decryption key 261. The output of decryption step 260 is hash value 142 of the combined image data and quality metrics that were used in forming the secure assurance data. Hash value 142 from the secure assurance data is then used to authenticate image data 20' and image quality metrics 101' by comparing hash value 142' with hash value 142 using authentication step 280. If the two image hash values are the same, image data 20' is output as authenticated image data 70 and image quality metrics 101' are output as authenticated image quality metrics 71. If the two image hash values are different, either image data 20' has been changed in some way from the original image data 20, or image quality metrics 101' have been changed in some way from original image quality metrics 101. In either case, neither image data 20' or image quality metrics 101' can be authenticated. As described previously, the authentication process provides an indicator the authenticity (or lack of authenticity) by outputting authenticity status signal 72.

Embodiments of the present invention can be implemented in a computer system that is separate from the digital capture device, or can be implemented as an integral part of the capture device. In particular, CMOS image sensors with integrated image processing capabilities are becoming increasingly common, and the present invention for producing assured images could be implemented in such sensors with the benefit of assured images being produced directly as output from the sensors.

Thus, we have disclosed a method for producing assured image data that includes secure quality metrics and image data to allow the integrity and the quality of the assured image to be quickly and easily verified at any time. This method is applicable to any image capture device, regardless of whether it is a document scanner, video camera, still camera, film scanner, or other suitable image capture device.

It will be understood that a computer program product that provides the present invention may make use of image manipulation algorithms and processes that are well known. Thus, it will be understood that a computer program product embodiment of the present invention may embody algorithms, routines, and processes not specifically shown or described herein, such as are useful for implementation. Such algorithms, routines, and processes can be conventional and within the ordinary skill in such arts. Other aspects of such algorithms and systems, and hardware and/or software for producing and otherwise processing the images involved or co-operating with the computer program product of the present invention, may not be specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware or firmware known as application specific integrated circuits (ASICS) or as programmable digital logic chips, such as field programmable gate arrays (FPGAs).

The invention has been described in detail with particular reference to certain preferred embodiments thereof, but it will be understood that variations and modifications can be effected within the spirit and scope of the invention.

| PARTS LIST | |
|---|---|
| 10 | Document scanner |
| 11 | Digital still camera |
| 12 | Digital video camera |
| 13 | Motion picture film scanner |
| 14 | Generic digital capture device |
| 20 | Image data |
| 20' | Image data, possibly changed |
| 21 | Image data with watermark |
| 30 | Assurance process |
| 40 | Assured image |
| 50 | Storage device |
| 51 | Transmitter |
| 52 | Receiver |
| 60 | Authentication process |
| 70 | Authenticated image data |
| 71 | Authenticated image quality metrics |
| 72 | Authenticity status signal |
| 80 | Data buffer |
| 90 | Image segmentation step |
| 91 | Segmented image data |
| 100 | Image quality metrics calculation step |
| 101 | Image quality metrics |
| 101' | Image quality metrics, possibly changed |
| 102 | Image quality specifications |
| 103 | Image quality comparison step |
| 104 | User alert step |
| 105 | Exception handling |
| 110 | Secure assurance data production step |
| 111 | Secure assurance data |
| 112 | Unique identifier for secure assurance data |
| 120 | Assurance data association step |
| 130 | Compound document |
| 131 | Text region |
| 132 | Photograph region |
| 133 | Graphics region |
| 135 | Bank check |
| 136 | Convenience amount region |
| 137 | Legal amount region |
| 138 | Signature region |
| 139 | MICR region |
| 140 | Hash calculation step |
| 141 | Image hash value |
| 141' | Image hash value, possibly changed |
| 142 | Assurance data (hash value of combined image data and quality metrics) |
| 142' | Hash value of combined image data and quality metrics, possibly changed |
| 150 | Image hash value and image quality metrics combination step |
| 151 | Assurance data (combined image hash value and image quality metrics) |
| 160 | Encryption step |
| 161 | Encrypted image hash value and image quality metrics |
| 162 | Encryption key |
| 163 | Encrypted hash value of combined image data and quality metrics |
| 170 | Secure assurance data formation step |
| 180 | Image data and image quality metrics combination step |
| 181 | Combined image data and image quality metrics |
| 181' | Combined image data and image quality metrics, possibly changed |
| 190 | Test target |
| 200 | Test target barcode |
| 210 | Test target image fragment |
| 220 | Test target detection step |
| 230 | Test target image quality metrics calculation step |
| 231 | Test target quality metrics |
| 240 | Intermediate storage |
| 250 | Assured image parsing step |
| 260 | Decryption step |
| 261 | Decryption key |
| 270 | Image data authentication step |
| 280 | Image data and image quality metrics authentication step |

The invention claimed is:

1. A method for producing an assured image, the method executed at least in part by a computer and comprising:
   a) acquiring image data;
   b) segmenting the image data to form two or more segmented spatial regions according to type of image content;
   c) calculating one or more quality measures from the image data that is within each of the two or more segmented spatial regions to produce a plurality of quality measures, wherein each segmented region has one or more corresponding quality measures;
   d) producing secure assurance data that includes the plurality of quality measures produced from each of the two or more segmented spatial regions and the image data;
   e) associating the secure assurance data with the image data to produce the assured image; and
   f) storing the assured image in a data storage device.

2. The method of claim 1, wherein step d) further includes:
   calculating a hash value of the image data and the plurality of quality measures to produce assurance data; and
   encrypting the assurance data to produce the secure assurance data.

3. The method of claim 2, wherein the encrypting is performed using a private key of a public/private key pair.

4. The method of claim 2, wherein the secure assurance data further includes one or more unencrypted quality measures.

5. The method of claim 1, wherein step d) further includes:
   combining the image data and the plurality of quality measures to form combined image data and quality measures;
   calculating a hash value of the combined image data and quality measures;
   encrypting the hash value to produce an encrypted hash value; and
   combining the plurality of quality measures and the encrypted hash value to produce secure assurance data.

6. The method of claim 5, wherein the encrypting is performed using a private key of a public/private key pair.

7. The method of claim 1, further including the steps of:
   f) comparing the quality measures to predetermined quality specification values; and
   g) sending an alert signal if the quality specifications are not met by the quality measures.

8. The method of claim 7, wherein step g) further includes:
   routing the digital image data to an exception handling process if the quality specifications are not met by the quality measures.

9. The method of claim 1, wherein the secure assurance data further includes one or more quality measures that are computed from test target image data.

10. The method of claim 1, wherein associating the secure assurance data with the image data comprises:
    forming a digital file from the image data, wherein the digital file includes an image header; and
    storing the secure assurance data in the image header.

11. The method of claim 1, wherein associating the secure assurance data with the image data comprises:
    storing the secure assurance data in a database;
    forming a digital file from the image data, wherein the digital file includes an image header and an image filename; and
    incorporating a unique reference value in the image header or the image filename that points to an entry in the database that contains the secure assurance data.

12. The method of claim 1, wherein associating the secure assurance data with the image data comprises embedding the secure assurance data into the image data using a reversible watermarking technique.

13. The method of claim 1 wherein at least two of the two or more segmented spatial regions are overlapping.

14. The method of claim 1 wherein the union of the two or more segmented spatial regions does not encompass the entire image.

15. A method for forming an assured image, the method executed at least in part by a computer and comprising:
    acquiring digitized image data from an image capture device; and
    storing secure assurance data that is associated with the digitized image data in a data storage device, wherein the secure assurance data is representative of the image data and a plurality of quality measures that are obtained at least from each of two or more spatial regions within the image data, wherein the two or more spatial regions differ from each other according to the type of image in the spatial regions.

16. The assured image of claim 15, wherein:
    the image data is represented as a digital file with an image header; and
    the secure assurance data is stored in the image header.

17. The assured image of claim 15, wherein:
    the secure assurance data is stored in a database;
    the image data is represented as a digital file with an image header and an image filename; and
    a unique reference value is incorporated in the image header or the image filename that points to an entry in the database that contains the secure assurance data.

18. The assured image of claim 15, wherein the secure assurance data is embedded in the image data using a reversible watermarking technique.

19. The assured image of claim 15, wherein the secure assurance data comprises encrypted data that represents the plurality of quality measures and the image data.

20. The assured image of claim 15, wherein the secure assurance data comprises the one or more quality measures and encrypted data that includes a hash value for a combination of the image data and the one or more quality measures.

21. The assured image of claim 15, wherein the secure assurance data further comprises one or more quality measures that are computed from test target image data.

22. The method of claim 15 wherein at least two of the two or more spatial regions are overlapping.

23. A method for authenticating an assured image, the method executed at least in part by a computer and comprising:
    a) parsing the assured image to produce image data and secure assurance data;
    b) decrypting the secure assurance data to produce a first image hash value and authenticated image quality metrics obtained from each of two or more spatial regions of the image according to type of image content;
    c) calculating a second hash value from the image data;
    d) comparing the first hash value with the second hash value;
    e) outputting authenticated image data if the first hash value and the second hash value are the same; and
    f) outputting an authenticity status signal that indicates whether the first hash value and second hash value are the same.

24. The method of claim 23, wherein the decrypting is performed using the public key of a public/private key pair.

* * * * *